United States Patent
Kalama et al.

(10) Patent No.: US 10,828,573 B1
(45) Date of Patent: Nov. 10, 2020

(54) INTERACTIVE TOY

(71) Applicant: Disney Enterprises, Inc., Burbank, CA (US)

(72) Inventors: Asa K. Kalama, Burbank, CA (US); Robert S. Trowbridge, Burbank, CA (US); Peter Stepniewicz, Altadena, CA (US); Casey M. Ging, Glendale, CA (US); John C. Hampton, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 16/421,223

(22) Filed: May 23, 2019

(51) Int. Cl.
*A63G 31/16* (2006.01)
*A63F 13/825* (2014.01)
*A63F 13/235* (2014.01)
*A63F 13/213* (2014.01)

(52) U.S. Cl.
CPC .......... *A63F 13/825* (2014.09); *A63F 13/213* (2014.09); *A63F 13/235* (2014.09); *A63G 31/16* (2013.01); *A63F 2300/20* (2013.01)

(58) Field of Classification Search
CPC ... A63G 3/00; A63G 3/02; A63G 7/00; A63G 31/00; A63G 31/16; A63H 13/00; A63H 13/005
USPC ................. 472/43, 59–61, 130; 446/175, 484
See application file for complete search history.

(56) References Cited

U.S. PATENT DOCUMENTS

| | | | | |
|---|---|---|---|---|
| 8,858,351 | B2 * | 10/2014 | Crawford ................. | A63G 7/00 463/30 |
| 2010/0062866 | A1 * | 3/2010 | Schnuckle ................ | A63J 1/02 472/78 |
| 2013/0244801 | A1 * | 9/2013 | Frolov .................... | A63G 3/02 472/61 |
| 2015/0190726 | A1 * | 7/2015 | Frolov ................... | A63G 31/16 472/61 |
| 2016/0158659 | A1 * | 6/2016 | Pradhan ............... | A63H 13/005 446/175 |

* cited by examiner

*Primary Examiner* — Kien T Nguyen
(74) *Attorney, Agent, or Firm* — Kilpatrick Townsend & Stockton LLP

(57) ABSTRACT

Systems, methods, and devices disclosed herein relate to an improved interactive experience. The system can be for delivery of an interactive attraction experience. The system can include a passenger vehicle having a plurality of passenger locations and a content presentation system that can present a virtual portion of the attraction experience viewable from the plurality of passenger locations. The system can include a transceiver that can transmit a trigger signal and at least one processor. The at least one processor can control delivery of the virtual portion of the attraction experience via the content presentation system, detect presence of a non-ride device, and deliver a trigger signal via the transceiver to the non-ride device, the trigger signal linked with the attraction experience.

26 Claims, 8 Drawing Sheets

INTERACTIVE TOY

FIELD

The present disclosure relates generally to toys.

BACKGROUND

Toys are an object possessed by a user that encourage play and encourage imagination. Toys have long been used in many different types of play, including in sport-based play, role-play, and imaginative play. Toys have incorporated technology to provide different modes of enjoyment and interaction. For example, some early toys included pull-string powered mechanisms to create noises, to "talk", or to move, and more recent toys have included processing capabilities.

Toys are made in different forms and types and can include a building set, character-type toys such as an action figure, a character doll or a character doll, an animatronic doll, and a robot. Toys can further include non-character objects such as, for example, a shopping cart, a lawnmower, baby accessories, a cowboy pistol and belt, or the like, and toys can include costumes, clothing, or clothing accessories. While toys provide many different play experiences, further developments play objects, which includes toys and any object used in play, are desired.

BRIEF SUMMARY

Certain embodiments are directed to interactive play objects that can include toys. One aspect of the present disclosures relates to a device for interactive gameplay. The device includes: a body; a transmitter, embedded in the body, to transmit a self-describing signal for the interactive device; a receiver that can receive a trigger signal, the trigger signal transmitted in response to the self-describing signal; and a memory that can store the trigger signal and a plurality of pre-programmed responses in response to the trigger signal. In some embodiments, the pre-programmed responses include one or more of: an auditory response and a physical response. In some embodiments, the physical response can include any one of: moving an actuator, powering a light, and activating a motor. The device can include: a speaker to transmit the auditory response; and a processor in communication with the memory and the receiver. The processor can process a plurality of instructions for: identifying the trigger signal; selecting one of the plurality of pre-programmed responses in response to the trigger signal; and executing one of the plurality of pre-programmed responses. In some embodiments, the executing of the one of the plurality of pre-programmed responses includes at least one of transmitting the auditory response and performing the physical response.

In some embodiments, the memory can be a writable persistent storage that can store experience data and a plurality pre-preprogrammed responses. In some embodiments, the plurality of pre-programmed responses characterize a behavior of the device. In some embodiments, the processor can update the memory with new experience data. In some embodiments, updating the memory with the new experience data modifies future selection of one of the plurality of pre-programmed responses in response to a received trigger signal.

In some embodiments, the device includes at least one sensor for generating experience data. In some embodiments, the experience data is linked with a location and a time. In some embodiments, the receiver can receive new experience data. In some embodiments, the processor can update the memory with the new experience data. In some embodiments, updating the memory with the new experience data modifies future selection of one of the plurality of pre-programmed responses in response to a received trigger signal.

In some embodiments, the one of the plurality of pre-programmed responses is selected based on the trigger signal. In some embodiments, selecting one of the plurality of pre-programmed response includes: identifying a set of potential responses based on the trigger signal; and selecting one of the set of potential responses. In some embodiments, the one of the set of potential responses is randomly selected.

In some embodiments, executing the one of the plurality of pre-programmed responses includes: determining an execution parameter for the executing of the pre-programmed response; and executing the one of the plurality of pre-programmed responses according to the execution parameter. In some embodiments, the execution parameter can be at least one of: a delay; a magnitude; and a duration.

One aspect of the present disclosure relates to a system for delivery of an attraction experience. The system includes: a passenger vehicle having a plurality of passenger locations; a content presentation system that can present a virtual portion of the attraction experience viewable from the plurality of passenger locations; a transceiver that can transmit a trigger signal; and at least one processor. The at least one processor can: control delivery of the virtual portion of the attraction experience via the content presentation system; detect presence of a non-ride device, which non-ride device can be, for example, a toy; and deliver a trigger signal via the transceiver to the non-ride device. In some embodiments, the trigger signal can be linked with the attraction experience.

In some embodiments, the at least one processor can determine an attribute of the non-ride device. In some embodiments, the attribute of the non-ride device is based on experience data. In some embodiments, the experience data is linked with a location and a time. In some embodiments, the trigger signal is based, at least in part on the attribute of the non-ride device.

In some embodiments, the at least one processor can modify the attraction experience based on at least one of: the presence of the non-ride device; and the experience data of the non-ride device. In some embodiments, the trigger signal directs the non-ride device to react to an event in the attraction experience. In some embodiments, the event in the attraction experience includes the presence of a character. In some embodiments, the trigger signal directs the non-ride device to provide assistance to a possessor of the non-ride device. In some embodiments, providing assistance to the possessor of the non-ride device includes: determining at least one desired action of the possessor of the non-ride device; and providing information via the non-ride device facilitating the at least one desired action. In some embodiments, the trigger signal directs a specific reaction by the non-ride device. In some embodiments, the trigger signal directs one of a class of reactions by the non-ride device.

One aspect of the present device relates to a method for attraction experience delivery. The method includes: controlling delivery of a virtual portion of the attraction experience via a content presentation system, the virtual portion of the attraction experience perceivable from a passenger location within a passenger vehicle; detecting a presence of a non-ride device in the passenger vehicle; delivering a trigger signal to the non-ride device, the trigger signal directing an action of the non-ride device. In some embodiments, the trigger signal is linked with the attraction experience.

In some embodiments, the method includes determining an attribute of the non-ride device. In some embodiments, determining the attribute of the non-ride device includes receiving data from the non-ride device. In some embodiments, the attribute of the non-ride device is based on experience data. In some embodiments, the experience data characterizes experiences of the non-ride device and is location linked and time linked. In some embodiments, the trigger signal is based, at least in part on the attribute of the non-ride device.

In some embodiments, the method includes modifying the attraction experience based on at least one of: the presence of the non-ride device; and the experience data of the non-ride device. In some embodiments, the trigger signal directs the non-ride device to react to an event in the attraction experience. In some embodiments, the event in the attraction experience includes the presence of a character. In some embodiments, the character can be a virtual character.

In some embodiments, the trigger signal directs the non-ride device to provide assistance to a possessor of the non-ride device. In some embodiments, providing assistance to the possessor of the non-ride device includes: determining at least one desired action of the possessor of the non-ride device; and providing information via the non-ride device facilitating the at least one desired action. In some embodiments, the trigger signal directs a specific reaction by the non-ride device. In some embodiments, the trigger signal directs one of a class of reactions by the non-ride device.

A better understanding of the nature and advantages of embodiments of the present disclosure may be gained with reference to the following detailed description and the accompanying drawings.

DETAILED DESCRIPTION

Figure 1:
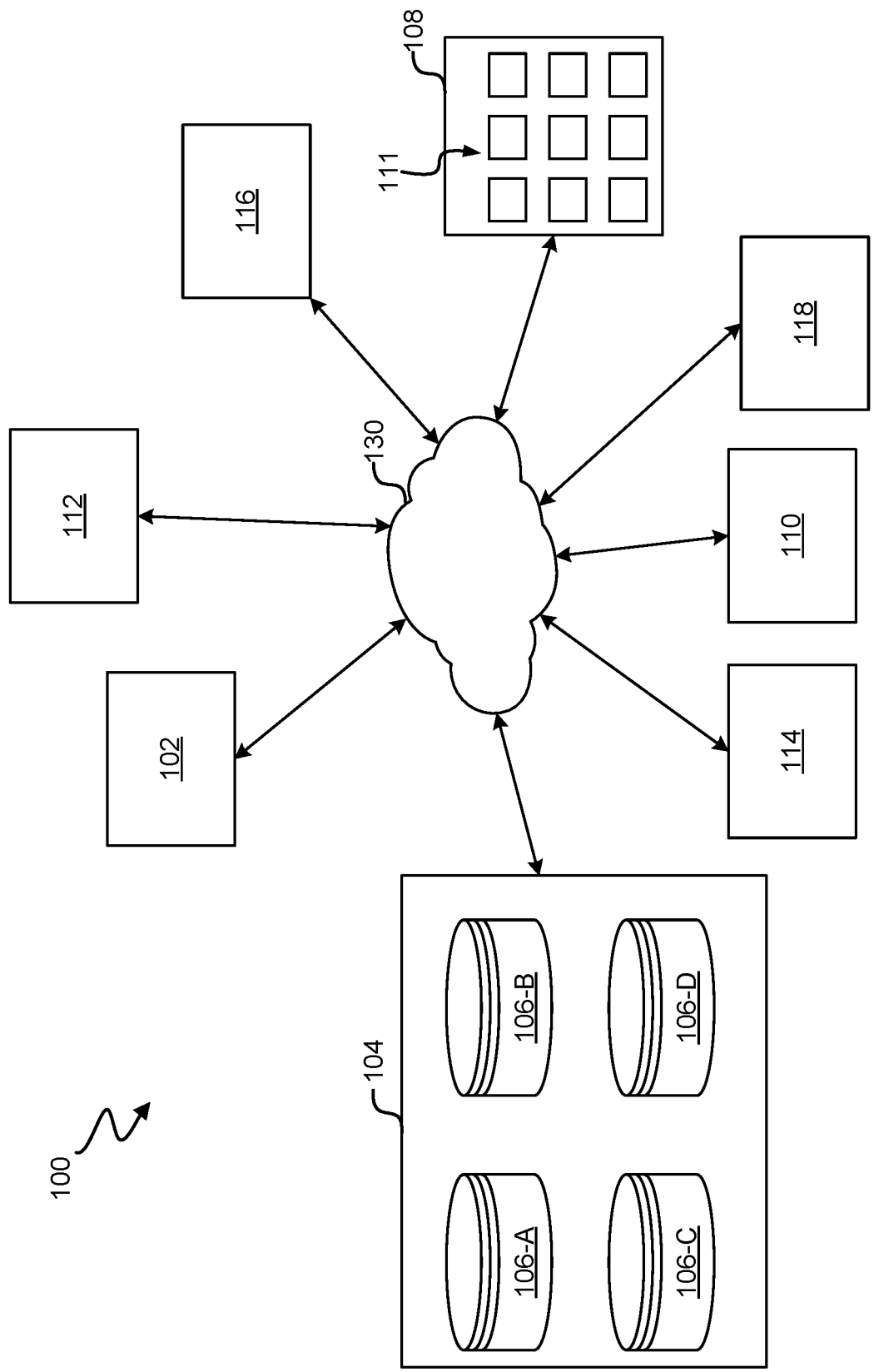
FIG. 1 is a schematic illustration of one embodiment of an interactive show system.

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

I. Introduction

Developing technologies in simulation present many opportunities for future creation of attractions that provide a unique and customized experience for ride passengers and/or for show viewers. As used herein, an attraction includes an amusement ride, an interaction or event such as an interaction with one or several characters, and/or a show. In some embodiments, these attractions can be within an attraction park and in some embodiments, these attractions can be in an amusement park, a themed store, a theater, and/or a restaurant such as a themed restaurant. While these technologies provide opportunities for future attractions, they also present challenges for the generation of content based on passenger responses to the attraction. For example, users may have play objects, which can include toys, relevant to the attraction, but the integration of these objects into the attraction can be problematic.

These and other problems can be overcome through the use of systems, devices, and methods as disclosed herein. For example, a play object, also referred to herein as a "non-ride device" when taken on an attraction, can include features enabling communication with the attraction, and the attraction may include features enabling detection of one or several non-ride devices in viewing area such as, for example, in a passenger vehicle and communication with some or all of these one or several non-ride devices. As used herein, a play object refers to any object that can be used to enhance participation or sense of embodiment in a themed attraction or environment. The play object can include any object that is used in play and can include a toy, a costume, an insignia, any worn or carried object, clothing, and/or a clothing accessory. Such play objects may be tokenized and/or may include features allowing communication with the play object and computer-based identification of the play object. As used herein, a "non-ride device" refers to a device owned, controlled and/or possessed by a passenger of the attraction and/or by a viewer of an attraction, and that is present at the attraction and/or is brought on to and removed from the attraction by the passenger. The non-ride device can include a play object such as a toy. This toy can include a doll including an action figure or a character doll, a stuffed animal, an animatronic doll, or a robot.

The attraction can be modified based on the detection of one or several non-ride devices in the passenger vehicle and/or in the viewing area and/or based on one or several attributes of these one or several non-ride devices. In some embodiments, characters, such as virtual characters, in the attraction can interact with one or several of the one or several non-ride devices. The attraction can further generate and send one or several trigger signals which can trigger a response of the non-ride device. This response can include, interaction with the character in the attraction, a response to an event in the attraction, assistance to a passengers, such as the owner, controller, and/or possessor of the non-ride device. This assistance can include providing information relating to one or several coming events and/or information relating to how to provide a desired response to one or several events. In some embodiments, this assistance can include the non-ride device providing and/or appearing to provide one or several inputs to controls of the attraction and/or taking one or several actions responsive to the attraction.

The trigger signals can be customized based on one or several attributes of the non-ride device. In some embodiments, for example, each non-ride device can include a memory containing experience data. This experience data can be accumulated by the non-ride device based on the interaction of the non-ride device with one or several other devices including one or several non-ride devices, the presence of the non-ride device at a location and/or at a location at a time, the previous presence of the non-ride device on one or several attractions, or the like. In some embodiments, the experience data can be generated by the non-ride device via one or several sensors of the non-ride device, and in some embodiments, the non-ride device can receive communications containing the experience data of the non-ride device. For example, if the non-ride device is taken into a store, the experience device could be generated by sensors of the non-ride device, or the experience data could be generated based on information received by communication components of the non-ride device from communication components transmitting information relating to one or several events in the store.

In some embodiments, upon receiving a trigger signal, a processor of the non-ride device can control the non-ride device to provide a desired action and/or reaction. In some embodiments, the trigger signal can specify an action and/or reaction, and the processor of the non-ride device can control the non-ride device to provide this action and/or reaction. In some embodiments, the trigger signal can specify a class of actions. Upon receipt of a trigger signal specifying a class of actions, the non-ride device can select one of the class of actions, and the processor of the non-ride device can control the non-ride device according to the selected one of the class of actions.

II. Interactive Show System

With reference now to FIG. 1 a schematic illustration of one embodiment of an interactive show system 100 is shown. The system 100 can be used to provide an attraction experience such as with an attraction. The attraction can include an amusement ride, a show, an interactive show, a concert, or the like. The system 100 can be used to provide an attraction experience that is interactive with one or several non-ride devices, or to provide interactive gameplay. The system 100 can include a processor 102. The processor 102 can be any computing and/or processing device including, for example, one or several laptops, personal computers, tablets, smartphones, servers, mainframe computers, processors, or the like. The processor 102 can be configured to receive inputs from one or several other components of the system 100, to process the inputs according to one or several stored instructions, and to provide outputs to control the operation of one or several of the other components of the system 100.

In some embodiments, the processor 102 can include a game engine that can include a rendering engine. The game engine and the rendering engine can together, or independently develop and/or progress the narrative of the simulation and/or the generate images corresponding to that narrative. The narrative comprises a sequence of occurrences and/or actions that are presentable, and in some embodiments are sequentially presentable, to an attraction passenger or to a show viewer. A modification to the narrative can include a change to all or to a portion of the narrative. Thus, in some embodiments, a modification to the narrative can include the addition of one, some, or all events, the exclusion of one, some, or all events, or the change of an aspect of one, some, or all events. Similarly, a modification to the narrative can include a change to a character or a character action in the narrative. Thus, a change in a line of a character in the narrative is a modification of the narrative.

In some embodiments, the narrative can take place in a virtual world. As used herein, the "virtual world" is a computer-based simulation environment generated by the game engine and/or rendering engine and from which the images, events, video, storylines, sounds, effects, or the like of the narrative are generated. In some embodiments, this virtual world can be presented to one or several passengers and/or viewers via a display such as provided via one or several projectors, screens, monitors, and/or speakers, and in some embodiments, the virtual world can be presented via the generation and/or delivery of one or several control signals which control action of one or several animated figures, animated props, or show action equipment, and in some embodiments, the virtual world can be presented via a combination of animatronic and display. In some embodiments, the rendering engine can generate one or several events that can be, in part, based upon user inputs provided to the system 100. These events can include, for example, one or several accelerations, decelerations, changes in direction, interaction with one or several objects or characters, or the like.

In some embodiments, the processor 102 can include a motion control. The motion control can control motion of a simulation vehicle 108—also referred to herein as a passenger vehicle 108, passenger conveyance 108, or attraction environment 108—via control of a motion base 110 that is connected to the simulation vehicle 108 and/or upon which or on which the simulation vehicle is mounted. In embodiments in which the interactive system provides all or portions of an attraction, the simulation vehicle 108 can hold passengers of that attraction. In embodiments in which the interactive system provides all or portions of a show, the simulation vehicle 108 can be the viewing area from which the show can be observed. Thus, in embodiments in which the show is performed to one or several passersby on a walkway, sidewalk, path, or street, the viewing area can be portions of the walkway, sidewalk, path, or street. The motion control can control motion of the simulation vehicle according to one or several inputs received from the user and/or one or several game events.

The system 100 can include memory 104. The memory 104 can represent one or more storage media and/or memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data. The memory 104 can be an integral part of the processor 102 and/or can be separate from the processor 102. In embodiments in which the memory 104 is separate from the processor 102, the memory 104 and the processor 102 can be communicatingly linked via, for example, communications network 130. In some embodiments, the communications network 130 can comprise any wired or wireless communication connection between the components of the simulation system 100.

The memory 104 can include software code and/or instructions for directing the operation of the processor 102 and/or can include one or several databases 106 containing information used by the processor 102 and/or generated by the processor 102.

The memory 104 can include a narrative/imagery database 106-A. The narrative/imagery database 106-A stores narrative and image data. This narrative and/or image data can define and/or bound the virtual world. This narrative and image data can include information and/or data relating to the narrative and the imagery generated as part of the narrative. Specifically, the narrative and image data is data and information that is used to generate the narrative and the imagery and/or sound in the narrative. This can include identification of one or several: objects; characters; effects; or things existing within the narrative, and data or databases defining these one or several: objects; characters; effects; or things. This data or databases defining the one or several: objects; characters; effects; or things can identify attributes of the one or several objects, characters, effects, or things, which attributes can define a size, a speed, sound, movement characteristics, illumination characteristics, or the like. The narrative database 106-A can further include information regarding events in the narrative and the sequencing of those events.

The memory 104 can include a vehicle database 106-B. The vehicle and/or actuator system database 106-B can include data relating to the simulation vehicle and/or the actuator system. In some embodiments, this database 106-B can include information relating to features of the simulation vehicle and/or relating to the control of the simulation vehicle and/or the interaction with user control features located on the simulation vehicle. In some embodiments, for example, the simulation vehicle can move in response to user inputs to the user control features and/or according to the narrative of the simulation or to events in the narrative of the simulation. The vehicle database 106-B can include data identifying one or several features of the simulation vehicle that enable the movement of the simulation vehicle. These features can include, for example, one or several motors, servo motors, pneumatic, electric, or hydraulic components, any motion causing component, or the like.

The memory 104 can include a trigger database 106-C. The trigger database 106-C can include information relating to one or several trigger signals. In some embodiments, the information relating to one or several trigger signals can comprise a set of information for each trigger signal, which information can direct a recipient non-ride device to take an action and/or to take an action from a class of actions. In some embodiments, the information relating to one or several trigger signal scan further relate to one or several events in the narrative and/or to one or several non-ride devices or experience data of non-ride devices. In some embodiments, for example, when an event occurs in the simulation and/or when an event in the simulation is approaching, the processor 102 can identify one or several potential trigger signals relevant to the event. The processor 102 can further identify one or several non-ride devices in the passenger vehicle and/or the experience data of each of these one or several non-ride devices. The processor 102 can then select one or several trigger signals based on the present one or several non-ride devices and/or the experience data of the present one or several non-ride devices.

The memory 104 can include a non-ride device database 106-D. The non-ride device database 106-D can include information relating to non-ride devices detected in the passenger vehicle and/or experience data of the one or several non-ride devices detected in the passenger vehicle. In some embodiments, this information can be stored until the completion of the simulation and/or the completion of the attraction. This information in the non-ride device database 106-D can be received from the non-ride devices in the passenger vehicle.

The system 100 can include one or several simulation vehicles 108. The simulation vehicle 108 can provide hardware corresponding to some or all of the features of the virtual conveyance in which the passenger is located in the gaming/simulation portion of the attraction experience. In some embodiments of the attraction, the simulation vehicle 108 can transport passengers from a starting position to a termination positon, which starting position can be the location at which passengers enter the simulation vehicle 108 and which termination position can be the location at which the passengers exit the simulation vehicle 108. In some embodiments, the starting position and the termination position can be co-located.

The simulation vehicle 108 can contain one or several passengers in, for one or several passenger locations 111. Each of these passenger locations 111 can include, for example, the location or one or several passengers, a seat, a restraint system, or the like. The simulation vehicle 108 and/or the components thereof can be communicatingly connected with the processor 102. This communication connection can allow the providing of information to the simulation vehicle 108, which information can control operation of all or portions of the simulation vehicle 108, and which communicating connection can allow the receipt of information from the simulation vehicle 108 by the server 102, which information can include one or several user inputs at the simulation vehicle 108. The simulation vehicle 108 can, in some embodiments, be movable according to the narrative and/or according to one or several events in the narrative to, in combination with generated imagery, create the sensation of movement for the passengers. In some embodiments, each of the simulation vehicles 108 can be mounted to, on, and/or upon a motion base 110, also referred to herein as the actuator system. The motion base 110 can move the simulation vehicle 108 that is mounted to, on, and/or upon the motion base 110. The motion base 110 can include one or several: motors; servo motors; pneumatic components; hydraulic components; electric components; any motion causing component; or the like.

The simulation vehicle 108 can include controls 109 through which one or several user inputs can be received. In some embodiments, these controls can include one or several: wheels; levers; buttons; control sticks; pedals; switches; slides; and knobs. In some embodiments, the simulation vehicle 108 can move and/or be configured to move according to control signals received from the processor 102 and/or the user control features.

The system 100 can communicate with one or several non-ride devices 112. In some embodiments each of non-ride devices 112 can comprise a toy such as, a doll including an action figure or a character doll, a stuffed animal, an animatronic doll, or a robot. In some embodiments, the system 100 can communicate with these one or several non-ride devices 112 when the one or several non-ride devices are in the simulation vehicle 108.

The system 100 can include a non-ride device detection system 114. The non-ride device detection system 114 can detect the presence of a non-ride device in the passenger vehicle 108. In some embodiments, the non-ride device detection system 114 can detect the presence of one or several non-ride devices via one or several communications protocols. In some embodiments, for example, the non-ride device detection system 114 can comprise one or several software modules or communication protocols executed using the non-ride device communication system 118 discussed below.

The system 100 can include a content presentation system 116 which can include an audio presentation system, one or several animatronic presentation systems, and/or a video presentation system. The content presentation system 116 can provide or present content to passengers of the passenger vehicle 108 including passengers of the attraction. The content presentation system 116 can be communicatingly connected with the processor 102 and can comprise one or several features configured to generate images according to one or several control signals received from the processor 102.

The content presentation system 116 can include hardware components configured to deliver content to the passengers of the simulation vehicles 108. The components of the content presentation system 116 can include, for example, one or several: speakers; sound generators; displays; screens; monitors; projectors; illuminators; speakers; lasers; fans; or heaters. In some embodiments, each simulation vehicle 108 can include a unique content presentation system 116 and in some embodiments, the content presentation system 116 can be non-unique to some or all of the simulation vehicles 108. In some embodiments in which the simulation vehicle 108 includes unique content presentation system 116, the content presentation system 116 can be a part of the simulation vehicle 108, can be attached to the simulation vehicle 108, and/or can move with the simulation vehicle 108 from the starting point to the termination point.

The content presentation system 116 can provide and/or present audio content via an audio presentation system. The audio presentation system can include, for example, an amplifier such as one or several of: a pre-amplifier; a power amplifier; a phono pre-amplifier; a subwoofer amplifier; and an integrated amplifier, one or several speakers such as one or several of: a subwoofer; a tweeter; and a mid-range speaker, a mixing engine, an equalizer, a speaker processor, and/or a scheduler. The content presentation system 116 can provide and/or present video content via the video presentation system. The video presentation system can include one or several: screens; displays; monitors; projectors; lasers; and/or light sources.

The system 100 can include a non-ride device communication system 118. The non-ride device communication system 118 can comprise one or several features for communication with one or several non-ride devices in the passenger vehicle 108. These one or several features can include, for example, an antenna, a transceiver, a transmitter, a receiver, or the like. The receiver and transceiver can receive information at the non-ride device 112 via, in some embodiment, electromagnetic communication including, for example, radio frequency communication, infrared communication, or visible light communication. In some embodiments, the transceiver and/or the transmitter can send information from the non-ride device 112 via, in some embodiments, electromagnetic communication including, for example, radio frequency communication, infrared communication, or visible light communication. In some embodiments, these non-ride device communication system 118 can communicate with the non-ride device 112 via any desired wireless communication regime, including, for example, via electromagnetic waves such as, for example, via radio frequency communication.

Figure 2:
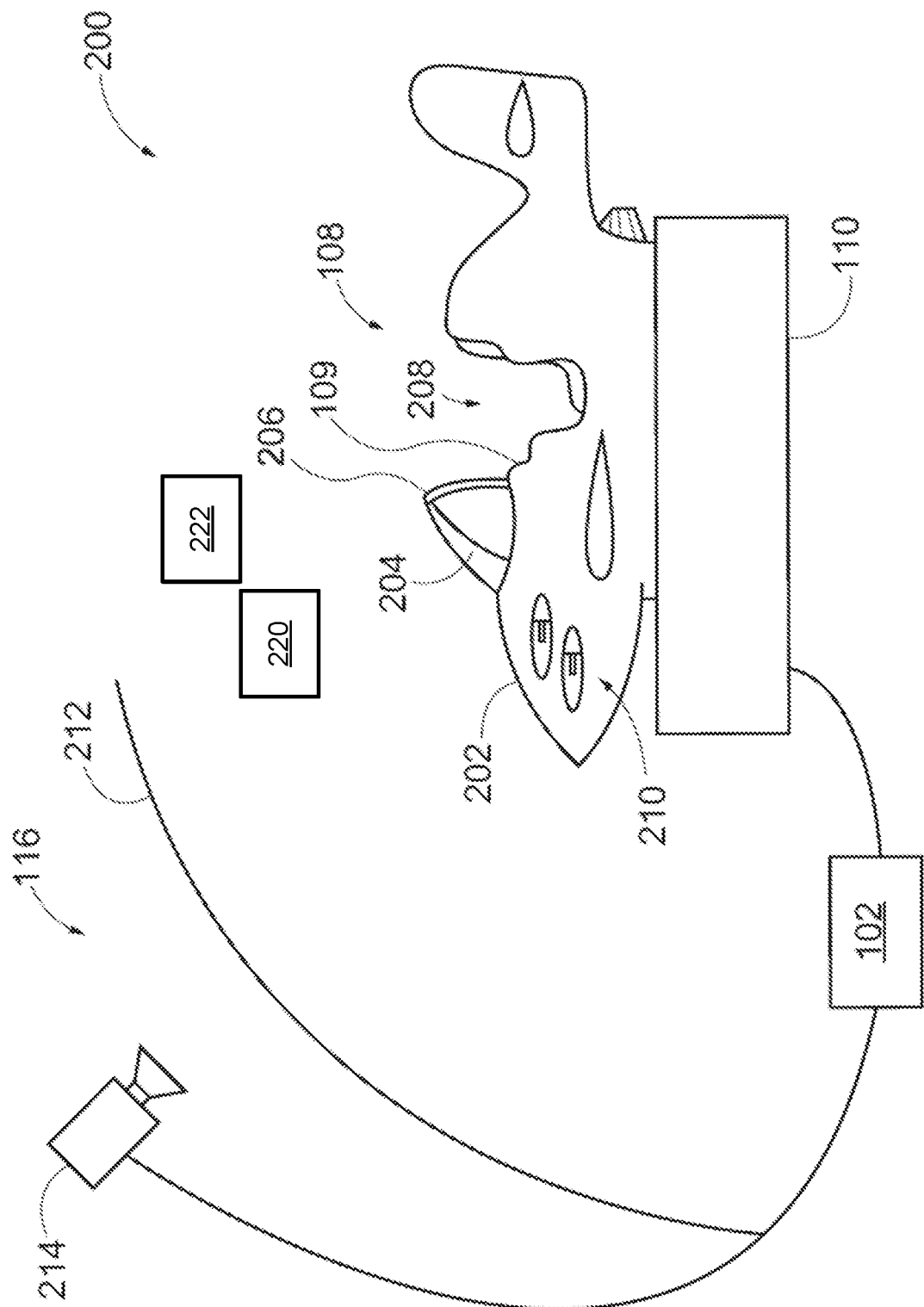
FIG. 2 is a schematic illustration of one embodiment of a simulation environment.

With reference to FIG. 2, a schematic illustration of a simulation environment 200 is shown. The simulation environment 200 can include all or portions of the system 100. Specifically, as seen in FIG. 2, the simulation environment 200 includes the simulation vehicle 108, the motion base 110, and the user controls 109. The simulation vehicle 108 shown in FIG. 2, further includes a body 202 including windows 204 and opaque structural features 206 such as, for example, a roof, pillars, posts, and/or window frames or framing. The simulation vehicle 108 can further include a passenger area 208 that can include the passenger locations 111 including, for example, one or several seats, restraints, or the like. The simulation vehicle 108 can include one or several accessory features 210.

The simulation environment 200 can include the content presentation system 116. The content presentation system 116 can include a screen 212 and at least one projector 214. The screen 212 can comprise a variety of shapes and sizes and can be made from a variety of materials. In some embodiments, the screen 212 can be flat, and in some embodiments, the screen 212 can be angled, curved, domed, or the like. In some embodiments, the screen 212 is curved and/or domed to extend around all or portions of the simulation vehicle 108, and specifically is curved and/or domed to extend around portions of the simulation vehicle 108 so that a passenger looking out of the simulation vehicle 108 sees the screen.

One or several projectors 214 can project images onto the screen 212. These projectors 214 can be located on the same side of the screen 212 as the simulation vehicle 108 or on the opposite side of the screen 212 as the simulation vehicle. The projectors 214 can be controlled by the processor 102.

The simulation environment 200 can include one or several detection features 220 and/or one or several communications features 222. These detection features 220 and/or communication features 222 can include, for example, one or several antennas. The one or several detection features 220 and/or one or several communications features 222 can communication with one or several non-ride devices 112 in the passenger vehicle 108.

III. Non-Ride Device

Figure 3:
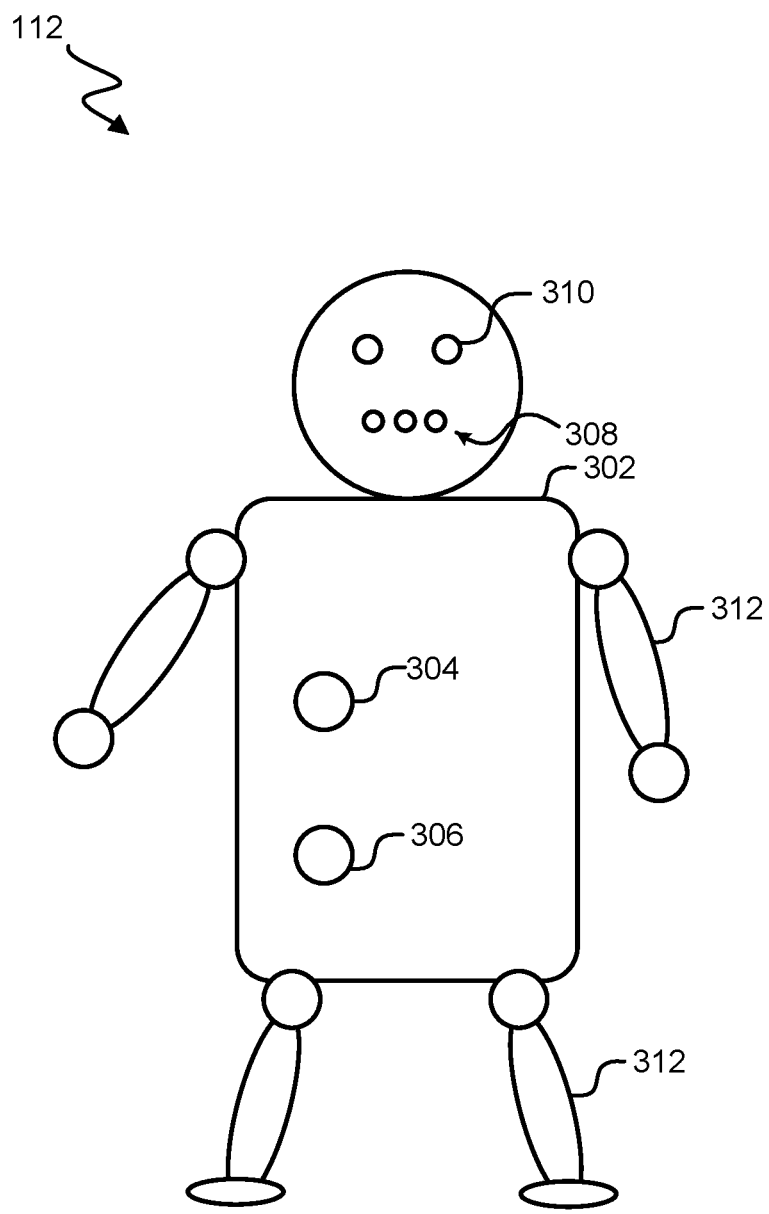
FIG. 3 is an exemplary depiction of one embodiment of a non-ride device.

With reference to FIG. 3, a schematic illustration of one embodiment of a non-ride device 112 is shown. The non-ride device 112 can comprise a play object that can be a toy such as, a doll including an action figure or a character doll, an insignia, a badge, a stuffed animal, an animatronic doll, or a robot. The non-ride device 112 can include a body that can house one or several component and/or to which one or several components can be connected. In some embodiments, the non-ride device 112 can include one or several communication features which can enable the non-ride device 112 to communicate with other components of the system 100. In some embodiments, the communication features can include, for example, a transceiver, a transmitter 304, and/or a receiver 306. In some embodiments, the functions of the transmitter 304 and the receiver 306 can be combined in a transceiver. The transmitter 304 can send information from the non-ride device 112, the information including, for example, information identifying the non-ride device 112, and/or information relating to experience data of the non-ride device 112. In some embodiments, the transmitter 304 can be embedded within the body 302 of the non-ride device 112 and can transmit one or several self-describing signals for the non-ride device 112, also referred to herein as the interactive device 112. The receiver 306 can receive information from other components of the system 100, from other components of a venue such as an amusement park, theater, or stage, and/or from other non-ride devices 112. Specifically, the receiver can receive one or several trigger signals from the attraction, and specifically from the non-ride device communication system 118. In some embodiments, the non-ride device communication system 118 can deliver the trigger signal in response to receipt of the self-describing signal. In some embodiments, the receiver 306 can receive new experience data. This new experience data can be received from other non-ride devices 112 and/or from one or several modules configured to communicate with the non-ride device 112. In some embodiments, the transmitter 304, the receiver 306, and/or the transceiver can send and/or receive information via electromagnetic communication including, for example, radio frequency communication, infrared communication, or visible light communication.

The non-ride device 112 can include output features wherewith the non-ride device 112 can output information to the possessor of the non-ride device 112. These features can include, for example, one or several speakers 308, one or several lights, one or several displays, and/or one or several screens. The non-ride device 112 can further include one or several sensors 310. The sensors 310 can sense attributes of the environment surrounding the non-ride device 112. These sensors can include, for example, one or several cameras, microphones, accelerometers, thermometers, and/or location features such as one or several GPS antennas. In some embodiments, the one or several sensors 310 can generate experience data, which experience data can, in some embodiments, be linked with a location and/or a time.

The non-ride device 112 can further include one or several movement features 312. These features 312 can be controlled by the non-ride device 112 to move the non-ride device 112 and/or to take some action. In some embodiments, these movement features 312 can comprise one or several appendages such as, for example, one and/or several arms or legs. These arms and/or legs can be controlled by the non-ride device 112 to move the non-ride device 112 and/or can be controlled to perform a desired movement or to take a desired action.

Figure 4:
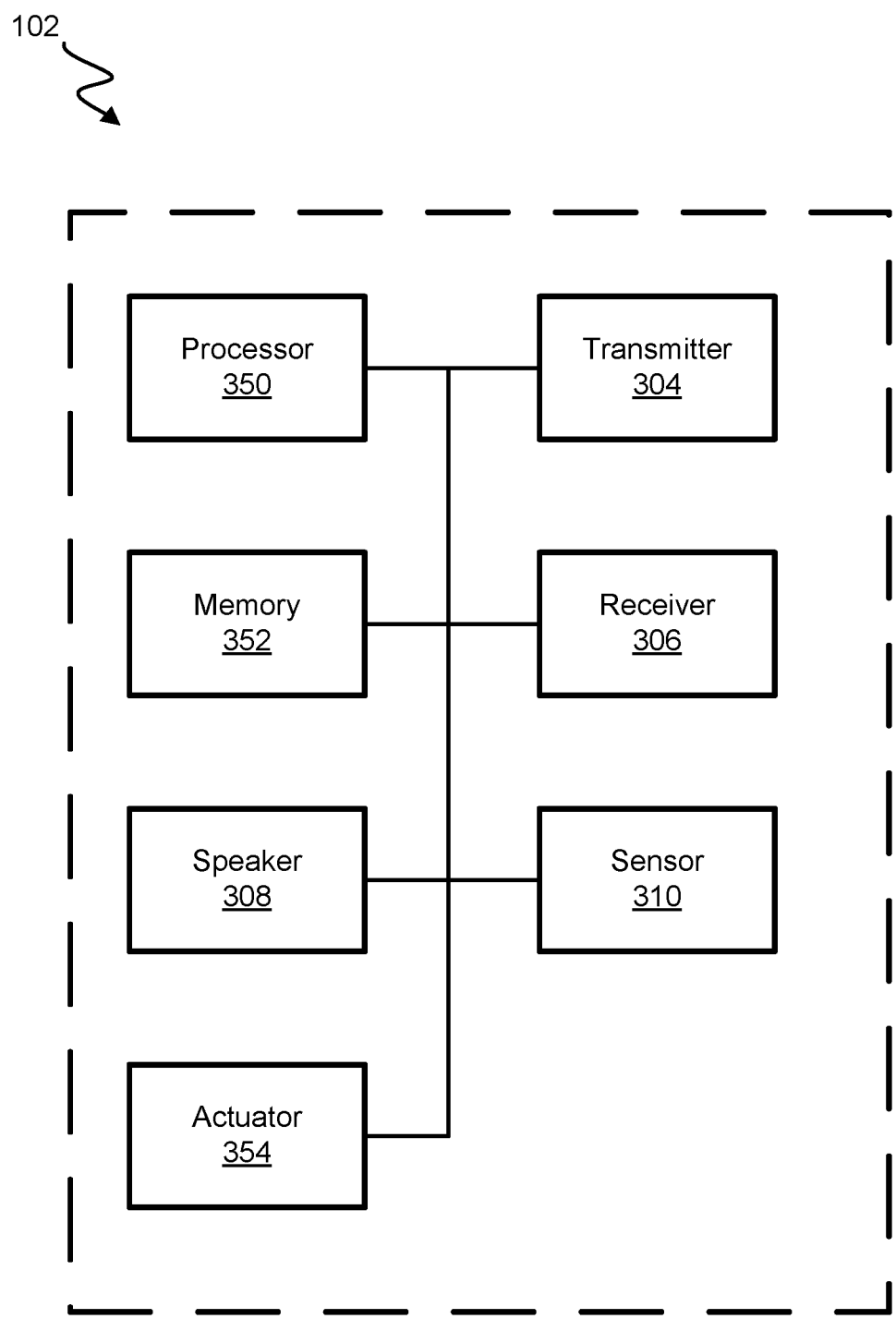
FIG. 4. is a functional block diagram depicting components of one embodiment of a non-ride device.

With reference now to FIG. 4, one embodiment of a functional block diagram depicting components of the non-ride device 112 is shown. The components of the non-ride device 112 can be communicatingly coupled with each other. As seen in FIG. 4, the non-ride device 112 can include the transmitter 304, the receiver 306, the speaker 308, and/or the sensor 310. In some embodiments, the non-ride device 112 can further include a device processor 350 that can receive information from one or several components of the non-ride device 112 and provide control signals to one or several components of the non-ride device 112.

The non-ride device 112 can further include device memory 352. The device memory 352 can comprise volatile and/or non-volatile memory. The device memory can comprise one or several databases and can store one or several received trigger signals and/or a plurality of pre-programmed responses to one or several received trigger signals. In some embodiments, the device memory 352 can be updated, and/or the device 112 can be programmed by the user. In some embodiments, for example, the user may program the device 112 and/or update the device memory 352, and specifically update and/or change the plurality of pre-programmed responses in the device memory 352. In some embodiments, for example, this can be performed via the inserting of a programming device, such as a chip into the device 112. The device 112 can read the chip and retrieve information from the chip to reprogram the device 112 and/or to update the device memory 352. In some embodiments, the user may reprogram the device 112 by replacing all or portions of the memory, and specifically by removing and/or replacing all or portions of the memory of the device 112. In some embodiments, for example, the user may program and/or reprogram the device 112 such that the device has one or several desired attributes such as affiliations. In some embodiments, for example, the device 112 can be programmed to affiliate with one or several evil characters, and in some embodiments, the device 112 can be programmed to affiliate with one or several good characters. In some embodiments, this affiliation can be manifested through the programming and in the responses of the device 112 to one or several events or to the presence of one or several characters, which events or characters may be in the attraction.

In some embodiments, some or all of the pre-programmed responses can be organized into one or several classes of responses. In some embodiments, for example, a trigger signal may be linked with a single pre-programmed response, and in some embodiments, a trigger signal may be linked with a class of pre-programmed responses, which class of pre-programmed responses may comprise a plurality of pre-programmed responses. In some embodiments in which multiple non-ride devices 112 are in a single passenger vehicle 108, a trigger signal associated with a class of pre-programmed responses can prevent a large number, or all of the non-ride devices from having the same response to the trigger signal. In some embodiments, for example, when a non-ride device receives a trigger signal associated with a class of pre-programmed responses, one of the plurality of pre-programmed responses from the class of pre-programmed responses can be selected by each of the non-ride devices. In some embodiments, each non-ride device can randomly select the one of the plurality of pre-programmed responses, thereby decreasing the likelihood of multiple of the non-ride devices having the same response. In some embodiments, the non-ride devices 112 in the passenger vehicle 108 can communicate with each other to ensure that each of the non-ride devices 112 selects a unique one of the plurality of pre-programmed responses and/or that less than a maximum number of non-ride devices 112 select the same one of the plurality of pre-programmed responses.

In some embodiments, the device memory 352 can comprise a writable persistent storage that can store experience data and a plurality pre-preprogrammed responses. This plurality of pre-programmed responses characterize a behavior of the device 112. In some embodiments, the device processor 350 can update the device memory 352 with new experience data. The updating of the device memory 352 with the new experience data can modify future selection of one of the plurality of pre-programmed responses in response to a received trigger signal. Specifically, links between trigger signals and responses in the device memory 352 can be modified based on the experience data stored in the device memory 352. Thus, in some embodiments, a device 112 may be initially programmed to be friendly towards pirate characters, but after the generation of experience data, and the modification of the device memory 352 with this experience data, the device 112 may fear pirate characters.

In some embodiments, the device memory 352 can include one or several execution parameters. In some embodiments, the execution parameter can affect execution of one or several of the pre-programmed responses. In some embodiments, the execution parameter can affect a speed with which the pre-programmed response is executed, the duration of execution for the pre-programmed response, and/or the magnitude of execution of the pre-programmed response. In some embodiments, the execution parameter can identify at least one of: a delay for execution; a duration of execution; and a magnitude, such as a volume, of execution.

These pre-programmed responses can include one or more of: an auditory response; and a physical response. In some embodiments, the physical response can include at least one of: moving an actuator, powering a light, moving and/or manipulating an appendage, and/or activating a motor. In some embodiments, the processor 350 can provide one or several control signals based on the responses contained in the memory and/or based on one or several received trigger signals. In some embodiments, these one or several control signals can cause, for example, the speaker 308 to deliver and/or transmit an auditory response, can cause the one or several lights, one or several displays, and/or one or several screens to deliver a visual response, and/or cause one or several actuators 354 and/or motors to deliver a physical response via, for example, moving one or several movement features 312 of the device 112.

The device 112 can include one or several actuators 354. The one or several actuators 354, which actuators 354 can be, for example, one or several motors, hydraulic or pneumatic cylinders, electroactive polymer, and/or piezoelectric actuators. The one or several actuators 354 can control movement of the one or several movement features 312 of the device 112.

IV. Interactive Experience Delivery

Figure 5:
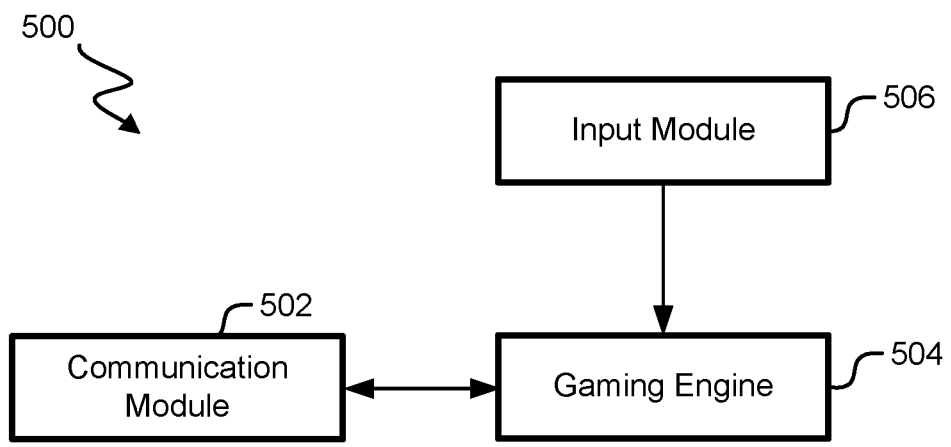
FIG. 5 illustrates a flow diagram for an exemplary method

With reference now to FIG. 5, a functional block diagram of modules 500 for interactive experience delivery is shown. These modules 500 can be hardware modules and/or software modules. In some embodiments, these modules 500 can be wholly or partially located on or in the processor 102. These modules include a communication module 502. The communication module 502 interacts with the non-ride device communication system 118 and/or the non-ride device detection system 114 to detect the presence of one or several non-ride devices 112 in the passenger vehicle 108, to receive data from the non-ride device 112, and/or to send one or several trigger signals or data to the non-ride device 112.

A gaming engine 504, also referred to herein as a "story engine" or as an "experience engine," can control the generation and/or presentation of the narrative of the attraction experience to a passenger of the simulation vehicle 108 and/or to a viewer of the attraction. This generation and/or presentation of the narrative can be based on the virtual world in which the attraction experience takes place and/or can include the generation of the virtual world in which the attraction experience takes place. The generation and/or presentation of the narrative can include the identification of game events that can be associated with a trigger signals. In some embodiments, these events can include, for example, which can include an acceleration, a deceleration, a change in direction of travel, a collision with an object, an explosion, and/or an appearance of a character. The generation and/or presentation of the narrative of the attraction experience can include generation of signals to control the content presentation system 116 to generate imagery and/or sound corresponding to one or several events in the narrative of the attraction experience.

In some embodiments, the experience engine 504 can receive information indicating the presence of one or several non-ride devices 112 in the passenger vehicle 108 and/or can receive information indicating one or several attributes of one or several non-ride devices in the passenger vehicle 108. The experience engine 504 can, based on this received information, modify all or portions of the narrative. In some embodiments, the modification can include generating and/or selecting one or several trigger signals to cause desired actions of the one or several non-ride devices 112 to contribute to the narrative. In some embodiments, for example, a character within the narrative may interact with the non-ride device, and trigger signals can be generated to cause reaction of the non-ride device to these interactions.

The input module 506 can communicate with the controls 109 of the simulation vehicle 108 to receive electrical signals corresponding to user inputs provided via the controls 109. The input module 506 can output information relating to the user inputs to an experience engine 504. In some embodiments, based on the received user inputs, the experience engine 504 can identify a response of the simulation vehicle 108 to the user inputs and/or the direct or indirect effects of the user inputs on the simulation vehicle 108. In some embodiments, and by way of example, a direct effect includes when a user input indicates a turn of the simulation vehicle 108, and an indirect effect includes when a user inputs causes the explosion of an object within the gaming/simulation portion of the attraction experience, which explosion creates shock-waves buffeting the simulation vehicle 108. The experience engine can further track the passenger's and/or simulation vehicle's 108 progression through the attraction experience.

In some embodiments, and based on inputs received from the input module 506, a skill level of one or several passengers can be determined. In some embodiments, if it is determined that a passenger has a skill level below a threshold level, the experience engine 504 can generate one or several trigger signals in association with events, which trigger signals cause the non-ride device 112 to provide assistance to this passenger. In some embodiments, for example, the trigger signal can cause the non-ride device to take an action to provide one or several inputs to the passenger vehicle 108 to cause a desired effect or action in the virtual world, and in some embodiments, the trigger signal can cause the non-ride device to take an action to provide guidance to the passenger to providing one or several inputs to the passenger vehicle 108 to cause a desired effect or action in the virtual world.

Figure 6:
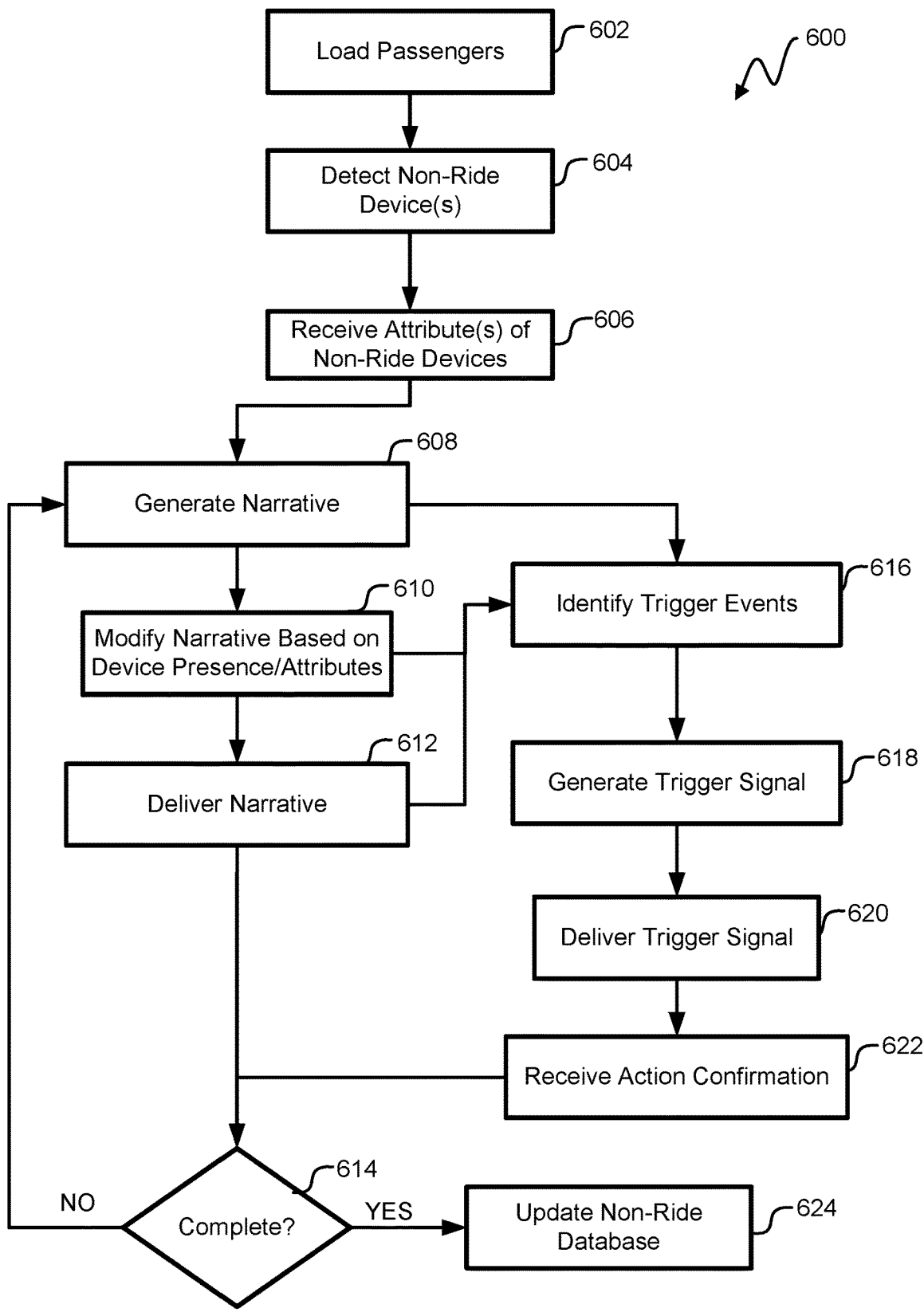
FIG. 6 is a flowchart illustrating one embodiment of a process for attraction experience delivery.

With reference now to FIG. 6, a flowchart illustrating one embodiment of a process 600 for attraction experience delivery is shown. The process 600 can be performed by all or portions of the system 100 and/or the modules 500 of FIG. 5. The process 600 can begin at block 602, wherein one or several passengers are loaded into the simulation vehicle 108 and/or enter into the simulation vehicle 108. In some embodiments, the simulation vehicle 108 can be the location(s) from which the show, which in some embodiments is a show that is not part of an amusement ride, is viewable. At block 604 the presence of one or several non-ride devices 112 in the simulation vehicle 108 is detected. In some embodiments, this detection can be performed during the loading of block 602 or subsequent to the loading of block 602. In some embodiments, step 604 can be performed independent of block 602.

At block 606 one or several attributes of each of the one or several non-ride devices detected in the passenger vehicle 108 can be determined. In some embodiments, this determination can be performed via communication with the non-ride device 112, and specifically via receipt of data from the non-ride device, which data characterizes these one or several attributes of the non-ride device. In some embodiments, this data can comprise experience data of the non-ride device 112 and/or can be derived from the experience data of the non-ride device 112. This experience data can characterize one or several experiences of the non-ride device 112, and in some embodiments, the experience data can be location linked and/or time linked.

At block 608, the narrative is generated. In some embodiments, this can include the generation and/or retrieval of content for presenting to passengers of the passenger vehicle 108. As indicated in block 610, the narrative can be modified based on the presence of one or several non-ride devices in the passenger vehicle 108 and/or based on the attributes of one, some, or all of the non-ride devices 112 in the passenger vehicle 108. In some embodiments, the narrative can be modified based on a combination of non-ride devices 112 present in the passenger vehicle 108. In such an embodiment, the modification can be specific to the combination of non-ride devices 112 present in the passenger vehicle 108. In some embodiments, the modifying of the narrative can include the inputting of information indicating the presence of the one or several non-ride devices 112 into the experience engine 504 and inputting information identifying at least one attribute of each of the one or several non-ride devices 112 into the experience engine 504. The experience engine 504 can generate the modified narrative based on, at least in part, these received inputs. In some embodiments, modifying the narrative can cause modification of the attraction experience of passengers in the passenger vehicle 108.

At block 612, the narrative is delivered. In some embodiments, this can include the controlling of delivery of a virtual portion of the attraction experience via a content presentation system 116. In some embodiments, the virtual portion of the attraction experience can be perceivable from a passenger location 111 within the passenger vehicle 108. At decision step 614, it is determined if the narrative is complete. If it is determined that the narrative is incomplete, then the process 600 can return to 608 and the generation, modification, and/or delivery of the narrative can continue. If it is determined that the narrative is complete, which completion can correspond to the end of the attraction, then the process 600 proceeds to block 624, wherein the non-ride database is updated. In some embodiments, this can include the deletion of information relating to the presence of one, some, or all of the non-ride devices in the passenger vehicle 108.

At block 616 one or several trigger events can be generated. In some embodiments, step 616 can be performed simultaneous with and/or after any of steps 608-612. In some embodiments, a trigger event is an event having an associated and/or desired action and/or reaction of one or several non-ride devices 112 in the passenger vehicle 108.

At block 618 one or several trigger signals are generated. In some embodiments, these trigger signals can be generated in association with the trigger events identified in block 616. In some embodiments, the step of block 618 can include the retrieval of one or several trigger signals from the 106-C. These trigger signals can be generated and/or selected based, at least in part on the attribute of the non-ride device 112.

In some embodiments, some or all of the identified trigger signals can direct one or several of the non-ride devices 112 in the passenger vehicle 108 to react to an event in the narrative. In some embodiments, this event can include the presence of a character, which character can be a virtual character, or in other words, a character in the virtual world and depicted via the content presentation system 116.

In some embodiments, the trigger signal directs the non-ride device 112 to provide assistance to a possessor of the non-ride device 112. In some embodiments, providing assistance to the possessor of the non-ride device 112 can include: determining at least one desired action of the possessor of the non-ride device 112; and providing information via the non-ride device 112 facilitating the at least one desired action. In some embodiments, the trigger signal directs a specific reaction by the non-ride device 112, and in some embodiments, the trigger signal directs one of a class of reactions by the non-ride device 112.

At block 620, the trigger signal is delivered. In some embodiments, the trigger signal can be delivered via the non-ride device communication system 118. At block 622, an action confirmation can be received, which action confirmation can confirm the receipt of the trigger signal, and the execution of the action associated with the trigger signal. In some embodiments, delivery of one or several future trigger signals can be modified based on receipt of action confirmation. In some embodiments, for example, if no action confirmation is received, future trigger signals may not be generated and/or delivered. In some embodiments, receipt of one or several action confirmations may result in the generation and delivery of an increased number of trigger signals.

Figure 7:
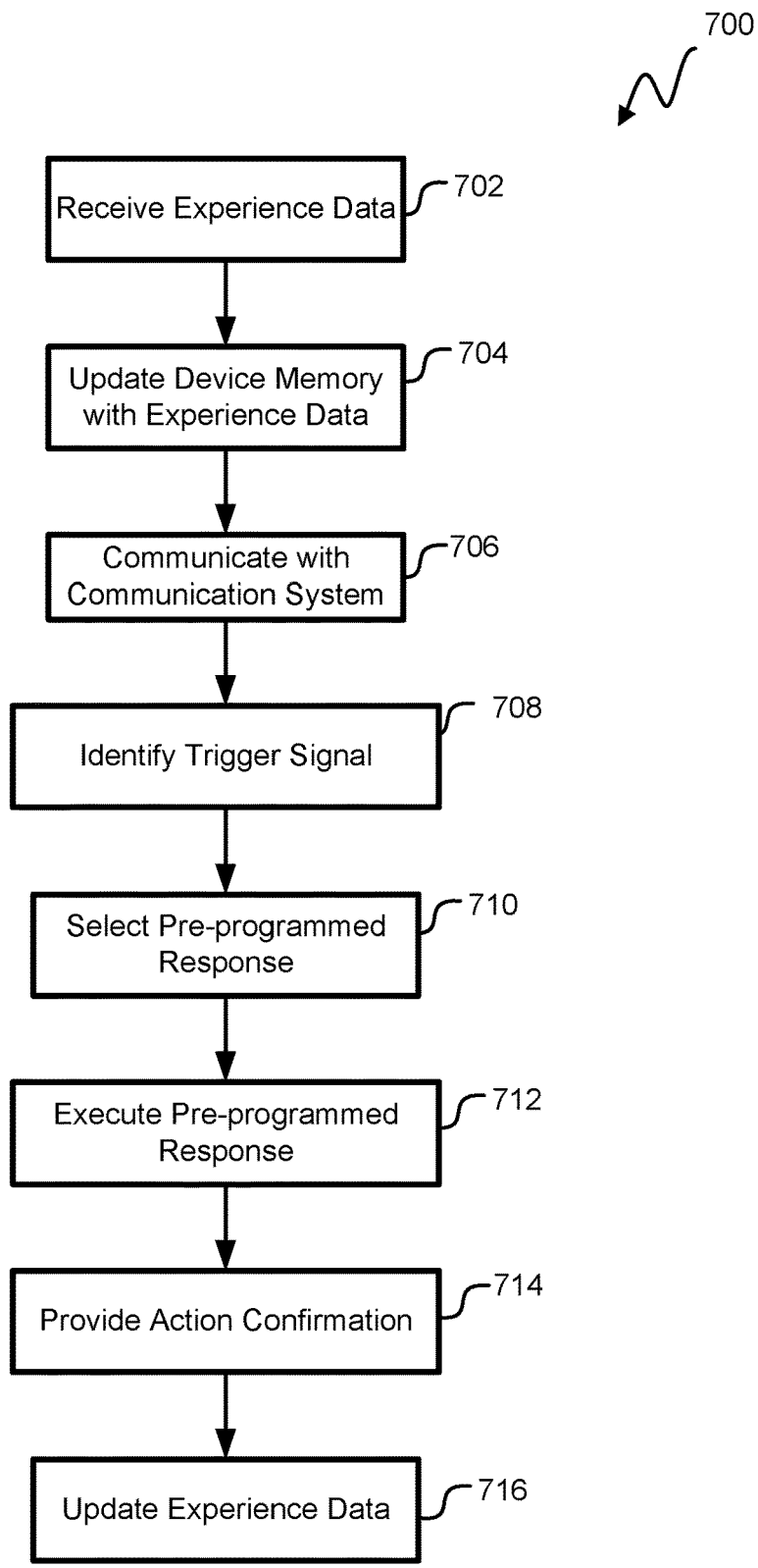
FIG. 7 is a flowchart illustrating one embodiment of a process for interactive gameplay by a non-ride device.

With reference now to FIG. 7, a flowchart illustrating one embodiment of a process 700 for interactive gameplay by a non-ride device 112 is shown. The process 700 can be performed by the non-ride device 112 and begins at block 702, wherein experience data is generated and/or received. In some embodiments, the experience data can be generated by sensors of the non-ride device 112, and/or in some embodiments, the experience data can be received by the receiver 306 of the non-ride device 112.

At block 704, device memory is updated based on the experience data newly received and/or generated in block 702. In some embodiments, this updating can be performed by the device processor 350. In some embodiments, this updating of the device memory with the new experience data can modify future selection of one of the plurality of pre-programmed responses in response to a received trigger signal.

At block 706, the non-ride device 112 communicates with the non-ride device communication system 118. In some embodiments, this can facilitate detection of the presence of the non-ride device 112 in the passenger vehicle 108 and/or can provide information from the non-ride device 112 to the non-ride device communication system 118.

At block 708, a trigger signal is received and identified. In some embodiments, the identification and/or receipt of the trigger signal can include extracting information from the trigger signal. At block 710 a pre-programmed response to the received trigger signal is selected. In some embodiments, this can include selecting one of the plurality of pre-programmed responses in response to the trigger signal. In some embodiments, the one of the plurality of pre-programmed responses is selected based on the trigger signal. In some embodiments, selecting one of the plurality of pre-programmed response can include: identifying a set of potential responses based on the trigger signal; and selecting one of the set of potential responses. In some embodiments, this response can be randomly selected, and in some embodiments, this response can be selected via communication with one or several other non-ride devices 112 in the passenger vehicle.

At block 712, the selected pre-programmed response is executed. In some embodiments, executing the one of the plurality of pre-programmed responses includes: determining an execution parameter for the executing of the pre-programmed response; and executing the one of the plurality of pre-programmed responses according to the execution parameter. In some embodiments, this execution parameter can identify a delay, a magnitude, and/or a duration of the response.

At block 714, an action confirmation is generated and provided to the non-ride device communication system 118 to indicate completion of execution of the non-ride response, and in block 716, the experience data is updated.

It should be appreciated that the specific steps illustrated in in the above figures provide particular methods of rendering images using an immersion content system according to various embodiments of the present disclosure. Other sequences of steps may also be performed according to alternative embodiments. For example, alternative embodiments of the present disclosure may perform the steps outlined above in a different order. Moreover, the individual steps illustrated in the figures above may include multiple sub-steps that may be performed in various sequences as appropriate to the individual step. Furthermore, additional steps may be added, or steps may be removed depending on the particular applications. One of ordinary skill in the art would recognize many variations, modifications, and alternatives.

Each of the methods described herein may be implemented using one or more computer systems. Each step of these methods may be executed automatically by one or the one or more computer systems, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

V. Computer System

Figure 8:
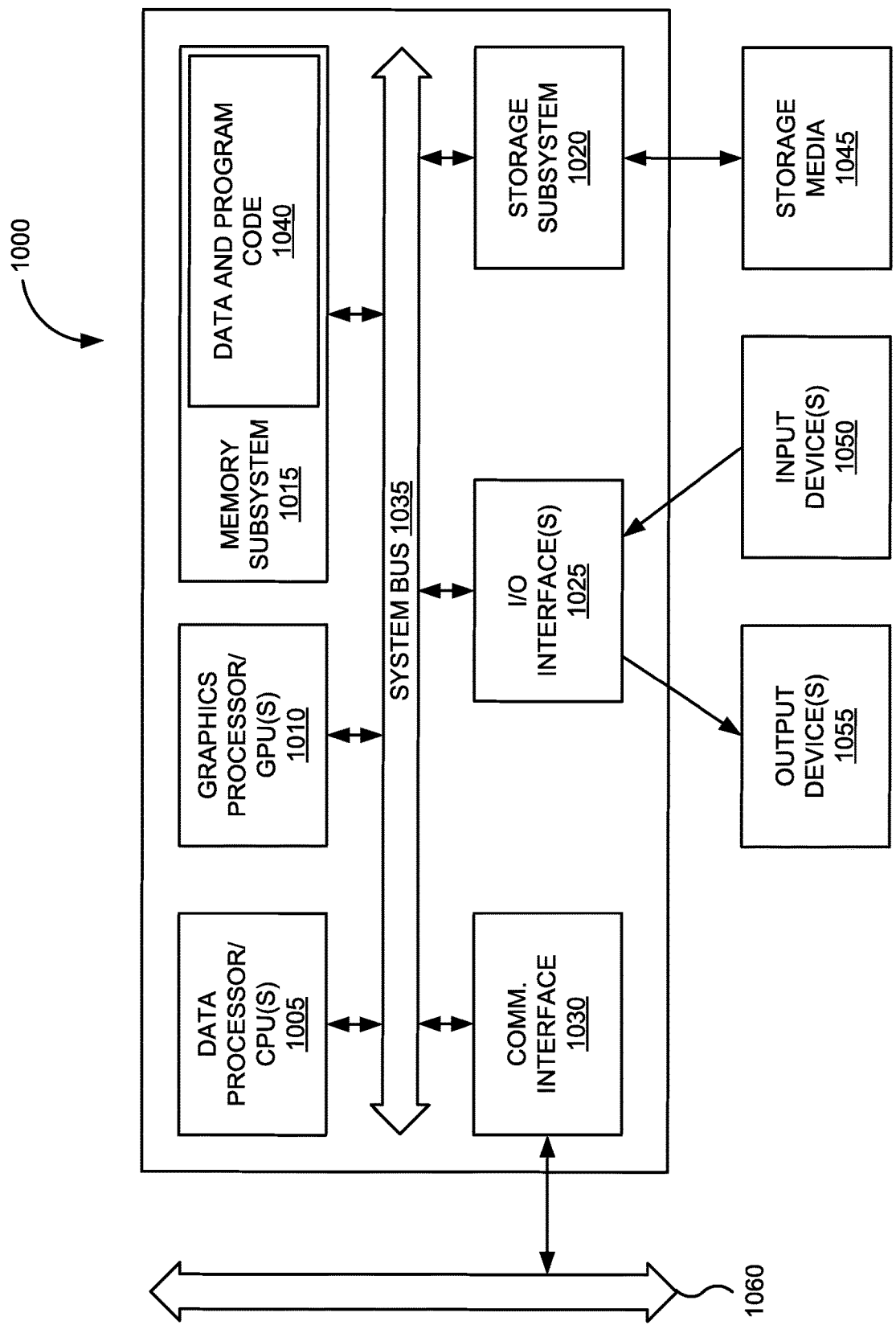
FIG. 8 is a depiction of one embodiment of a computer system.

FIG. 8 shows a block diagram of computer system 1000 that is an exemplary embodiment of the processor 102 and can be used to implement methods and processes disclosed herein. FIG. 8 is merely illustrative. Computer system 1000 may include familiar computer components, such as one or more one or more data processors or central processing units (CPUs) 1005, one or more graphics processors or graphical processing units (GPUs) 1010, memory subsystem 1015, storage subsystem 1020, one or more input/output (I/O) interfaces 1025, communications interface 1030, or the like.

Computer system 1000 can include system bus 1035 interconnecting the above components and providing functionality, such connectivity and inter-device communication.

The one or more data processors or central processing units (CPUs) 1005 execute program code to implement the processes described herein. The one or more graphics processor or graphical processing units (GPUs) 1010 execute logic or program code associated with graphics or for providing graphics-specific functionality. Memory subsystem 1015 can store information, e.g., using machine-readable articles, information storage devices, or computer-readable storage media. Storage subsystem 1020 can also store information using machine-readable articles, information storage devices, or computer-readable storage media. Storage subsystem 1020 may store information using storage media 1045 that can be any desired storage media.

The one or more input/output (I/O) interfaces 1025 can perform I/O operations and the one or more output devices 1055 can output information to one or more destinations for computer system 1000. One or more input devices 1050 and/or one or more output devices 1055 may be communicatively coupled to the one or more I/O interfaces 1025. The one or more input devices 1050 can receive information from one or more sources for computer system 1000. The one or more output devices 1055 may allow a user of computer system 1000 to view objects, icons, text, user interface widgets, or other user interface elements.

Communications interface 1030 can perform communications operations, including sending and receiving data. Communications interface 1030 may be coupled to communications network/external bus 1060, such as a computer network, a USB hub, or the like. A computer system can include a plurality of the same components or subsystems, e.g., connected together by communications interface 1030 or by an internal interface.

Computer system 1000 may also include one or more applications (e.g., software components or functions) to be executed by a processor to execute, perform, or otherwise implement techniques disclosed herein. These applications may be embodied as data and program code 1040. Such applications may also be encoded and transmitted using carrier signals adapted for transmission via wired, optical, and/or wireless networks conforming to a variety of protocols, including the Internet.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A system for delivery of a narrative, the system comprising:
    a passenger vehicle comprising a plurality of passenger locations;
    a content presentation system configured to present a virtual portion of a narrative viewable from the plurality of passenger locations;
    a transceiver configured to transmit a trigger signal; and
    at least one processor configured to:
        control delivery of the virtual portion of the narrative via the content presentation system;

detect a presence of a non-ride device possessed by a rider of the passenger vehicle;

receive a self-describing signal from the non-ride device; and deliver a trigger signal via the transceiver to the non-ride device, the trigger signal linked with the narrative, wherein the trigger signal is configured to direct the non-ride device to deliver a narrative consistent response.

2. The system of claim 1, wherein the at least one processor is further configured to determine an attribute of the non-ride device based at least in part of the self-describing signal received from the non-ride device.

3. The system of claim 2, wherein the attribute of the non-ride device is based on experience data.

4. The system of claim 3, wherein the experience data is linked with a location and a time.

5. The system of claim 4, wherein the trigger signal is based, at least in part on the attribute of the non-ride device.

6. The system of claim 5, wherein the at least one processor is further configured to modify the narrative based on at least one of: the presence of the non-ride device; and the experience data of the non-ride device.

7. The system of claim 6, wherein the trigger signal directs the non-ride device to react to an event in the narrative.

8. The system of claim 7, wherein the event in the narrative comprises the presence of a character.

9. The system of claim 8, wherein the trigger signal directs the non-ride device to provide assistance to a possessor of the non-ride device.

10. The system of claim 9, wherein providing assistance to the possessor of the non-ride device comprises: determining at least one desired action of the possessor of the non-ride device; and providing information via the non-ride device facilitating the at least one desired action.

11. The system of claim 10, wherein the trigger signal directs a specific reaction by the non-ride device.

12. The system of claim 10, wherein the trigger signal directs one of a class of reactions by the non-ride device.

13. A method for narrative delivery, the method comprising:

controlling delivery of a virtual portion of the narrative via a content presentation system, the virtual portion of the narrative perceivable from a passenger location within a passenger vehicle;

detecting a presence of a non-ride device in the passenger vehicle possessed by a rider of the passenger vehicle;

receiving a self-describing signal from the non-ride device;

delivering a trigger signal to the non-ride device, the trigger signal directing a narrative consistent action of the non-ride device, and wherein the trigger signal is linked with the narrative.

14. The method of claim 13, further comprising determining an attribute of the non-ride device based at least in part of the self-describing signal received from the non-ride device.

15. The method of claim 14, wherein determining the attribute of the non-ride device comprises receiving data from the non-ride device.

16. The method of claim 15, wherein the attribute of the non-ride device is based on experience data.

17. The method of claim 16, wherein the experience data characterizes experiences of the non-ride device and is location linked and time linked.

18. The method of claim 17, wherein the trigger signal is based, at least in part on the attribute of the non-ride device.

19. The method of claim 18, further comprising modifying the narrative based on at least one of: the presence of the non-ride device; and the experience data of the non-ride device.

20. The method of claim 19, wherein the trigger signal directs the non-ride device to react to an event in the narrative.

21. The method of claim 20, wherein the event in the narrative comprises the presence of a character.

22. The method of claim 21, wherein the character comprises a virtual character.

23. The method of claim 22, wherein the trigger signal directs the non-ride device to provide assistance to a possessor of the non-ride device.

24. The method of claim 23, wherein providing assistance to the possessor of the non-ride device comprises: determining at least one desired action of the possessor of the non-ride device; and providing information via the non-ride device facilitating the at least one desired action.

25. The method of claim 24, wherein the trigger signal directs a specific reaction by the non-ride device.

26. The method of claim 24, wherein the trigger signal directs one of a class of reactions by the non-ride device.

* * * * *